US012592967B2

(12) United States Patent
Olofsson

(10) Patent No.: US 12,592,967 B2
(45) Date of Patent: Mar. 31, 2026

(54) SYSTEMS FOR MALICIOUS WEBSITE DETECTION USING MACHINE LEARNING

(71) Applicant: BTBLOCK, Denver, CO (US)

(72) Inventor: Thomas Olofsson, Stockholm (SE)

(73) Assignee: BTblock, Denver, CO (US)

( * ) Notice: Subject to any disclaimer, the term of this patent is extended or adjusted under 35 U.S.C. 154(b) by 231 days.

(21) Appl. No.: 18/641,082

(22) Filed: Apr. 19, 2024

(65) Prior Publication Data

US 2024/0356970 A1    Oct. 24, 2024

Related U.S. Application Data

(60) Provisional application No. 63/460,857, filed on Apr. 20, 2023.

(51) Int. Cl.
*H04L 9/40* (2022.01)

(52) U.S. Cl.
CPC ........ *H04L 63/1483* (2013.01); *H04L 63/101* (2013.01)

(58) Field of Classification Search
CPC .................................................... H04L 63/1483
See application file for complete search history.

(56) References Cited

U.S. PATENT DOCUMENTS

| | | | | |
|---|---|---|---|---|
| 8,607,345 B1* | 12/2013 | Cruz | .................... | G06F 21/566 |
| | | | | 726/25 |
| 9,356,941 B1* | 5/2016 | Kislyuk | .................. | H04L 63/14 |
| 10,623,426 B1* | 4/2020 | Yumer | ................ | H04L 63/1425 |
| 10,834,128 B1* | 11/2020 | Rajagopalan | ........... | H04L 51/18 |
| 2010/0049688 A1* | 2/2010 | Matsumura | ......... | G06F 16/9566 |
| | | | | 706/54 |
| 2014/0033307 A1* | 1/2014 | Schmidtler | ......... | H04L 63/1483 |
| | | | | 726/22 |
| 2018/0012144 A1* | 1/2018 | Ding | .................. | H04L 63/1466 |
| 2018/0097822 A1* | 4/2018 | Huang | .................. | G06N 20/00 |
| 2019/0207967 A1* | 7/2019 | Vashisht | ............. | H04L 63/1408 |
| 2020/0014724 A1* | 1/2020 | Venkatasubramanian | .................. | |
| | | | | H04L 61/5007 |
| 2020/0104628 A1* | 4/2020 | Rajamohan | ........... | G06F 18/217 |
| 2021/0306375 A1* | 9/2021 | Patel | ....................... | G06F 21/53 |
| 2021/0314352 A1* | 10/2021 | Yadav | .................. | G06F 16/955 |
| 2022/0329626 A1* | 10/2022 | Sambamoorthy | ... | H04L 63/1483 |
| 2022/0368699 A1* | 11/2022 | Thomson | ............ | H04L 63/0236 |
| 2023/0082481 A1* | 3/2023 | Azarafrooz | ......... | H04L 63/0281 |
| | | | | 726/23 |

(Continued)

*Primary Examiner* — Hieu T Hoang

(74) *Attorney, Agent, or Firm* — Bradley Arant Boult Cummings LLP; Jacob W. Neu; Alex Huffstutter

(57) ABSTRACT

Systems are disclosed herein for detecting and preventing navigation of a user computer to malicious websites. The systems can detect malicious websites using machine learning models and domain name databases containing data on safe and unsafe websites. The systems can extract a uniform resource locator (URL) associated with a webpage and compare the URL with the domain name databases to determine if the URL is safe or unsafe. When the system detects an unsafe website, the system can update the domain name databases to include data on the new unsafe website. The machine learning model may be trained using the updated domain name databases to enhance the detection of malicious websites and prevent users from navigating to such websites.

20 Claims, 6 Drawing Sheets

(56)                 References Cited

U.S. PATENT DOCUMENTS

| | | | |
|---|---|---|---|
| 2023/0188541 A1* | 6/2023 | Chen | .................. H04L 63/1441 |
| | | | 726/1 |
| 2023/0224325 A1* | 7/2023 | Mautone | ................ G06F 21/31 |
| | | | 726/22 |

* cited by examiner

SYSTEMS FOR MALICIOUS WEBSITE DETECTION USING MACHINE LEARNING

TECHNICAL FIELD

The present disclosure generally relates to systems that detect malicious websites and prevent users from navigating to such websites.

BACKGROUND

The present disclosure generally relates to systems that detect malicious websites and prevent users from navigating to such websites. When a user navigates to a malicious website, there is a risk that the system may be harmed, such as by incurring a virus or being subject to a data breach. What is needed is an improved system for hindering a user from navigating to such malicious websites.

SUMMARY

To improve systems that detect malicious websites and prevent users from navigating to such websites, systems are presented herein that use a machine learning model and site reputation to hinder a user from navigating to such websites. The machine learning model can be trained using data from users of the system and open-source information, such as publicly available whitelists and blacklists, to identify potentially malicious websites. The system can warn a user of the risk a website poses by using the trained machine learning model to analyze the URL of the website and determine whether the URL is safe or unsafe. When the URL is determined to be unsafe, the system can block the malicious website from the user and/or send a notification to the user indicating that the website is unsafe. The machine learning model can be continuously trained with data about the unsafe websites detected, resulting in a self-learning and self-correcting system that improves the detection of malicious websites and prevents users and user computers from navigating to such websites.

One aspect of the disclosure is a system for detecting and preventing navigation of a user computer to malicious websites. The system may include one or more computers comprising one or more processors and one or more memories for storing a domain name database and having non-transitory computer-executable instructions stored thereon. The computer-executable instructions, when executed by the one or more processors, may be configured to perform one or more operations. The one or more operations may include displaying a web browser including a browser window. The one or more operations may include implementing a browser extension associated with the web browser. The one or more operations may include receiving via the web browser a request to retrieve a webpage via a domain name. The one or more operations may include extracting via the browser extension a uniform resource locator (URL) associated with the webpage. The one or more operations may include comparing the URL with the domain name database to determine if the URL is safe or unsafe. The one or more operations may include, if the URL is safe, allowing the requested webpage to be rendered in the browser window. The one or more operations may include, if the URL is unsafe, implementing a machine learning model configured to analyze the determined unsafe URL, reclassifying the URL as safe or unsafe using the machine learning model, if the URL is reclassified as safe, updating the domain name database with data on the reclassified URL to whitelist the domain name and allowing the requested webpage to be rendered in the browser window, and if the URL is reclassified as unsafe, blocking the requested webpage from being rendered in the browser window and training the machine learning model based on the reclassified unsafe URL.

Another aspect of the disclosure is a system for detecting and preventing navigation of a user computer to malicious websites. The system may include one or more computers including a client computer, the one or more computers including one or more processors and one or more memories for storing a domain name database and having non-transitory computer-executable instructions stored thereon. The computer-executable instructions, when executed by the one or more processors, may be configured to perform one or more operations. The one or more operations may include displaying a web browser including a browser window. The one or more operations may include implementing a browser extension associated with the web browser. The one or more operations may include receiving via the web browser a request to retrieve a webpage via a domain name. The one or more operations may include extracting via the browser extension a uniform resource locator (URL) associated with the webpage. The one or more operations may include comparing the URL with the domain name database to determine if the URL is safe or unsafe. The one or more operations may include, if the URL is safe, allowing the requested webpage to be rendered in the browser window. The one or more operations may include, if the URL is unsafe, implementing a machine learning model configured to analyze the determined unsafe URL via the one or more processors of the client computer, reclassifying the URL as safe or unsafe using the machine learning model, if the URL is reclassified as safe, allowing the requested webpage to be rendered in the browser window, and if the URL is reclassified as unsafe, blocking the requested webpage from being rendered in the browser window.

Another aspect of the disclosure is a system for detecting and preventing navigation of a user computer to malicious websites. The system may include one or more computers including a client computer, the one or more computers including one or more processors and one or more memories for storing a domain name database and having non-transitory computer-executable instructions stored thereon. The computer-executable instructions, when executed by the one or more processors, may be configured to perform one or more operations. The one or more operations may include displaying a web browser including a browser window. The one or more operations may include implementing a browser extension associated with the web browser. The one or more operations may include receiving via the web browser a request to retrieve a webpage via a domain name. The one or more operations may include extracting via the browser extension a uniform resource locator (URL) associated with the webpage. The one or more operations may include comparing the URL with the domain name database to determine if the URL is safe or unsafe. The one or more operations may include, if the URL is safe, allowing the requested webpage to be rendered in the browser window. The one or more operations may include, if the URL is unsafe, implementing a machine learning model configured to analyze the determined unsafe URL, reclassifying the determined unsafe URL as safe or unsafe using the machine learning model, if the URL is reclassified as safe, allowing the requested webpage to be rendered in the browser window, and if the URL is reclassified as unsafe, notifying a user via a notification that the URL is unsafe, receiving a request to render the requested webpage in the browser window or to block the requested webpage, if the request is to render the requested webpage in the browser window, allowing the requested webpage to be rendered in the browser window and generating an incident report, and if the request is to block the requested webpage, blocking the requested webpage from being rendered in the browser window. The one or more operations may include providing a client portal accessible by the client computer. The one or more operations may include displaying incident reports via the client portal.

Numerous other objects, advantages and features of the present disclosure will be readily apparent to those of skill in the art upon a review of the following drawings and description of various embodiments.

DETAILED DESCRIPTION

Figure 1:
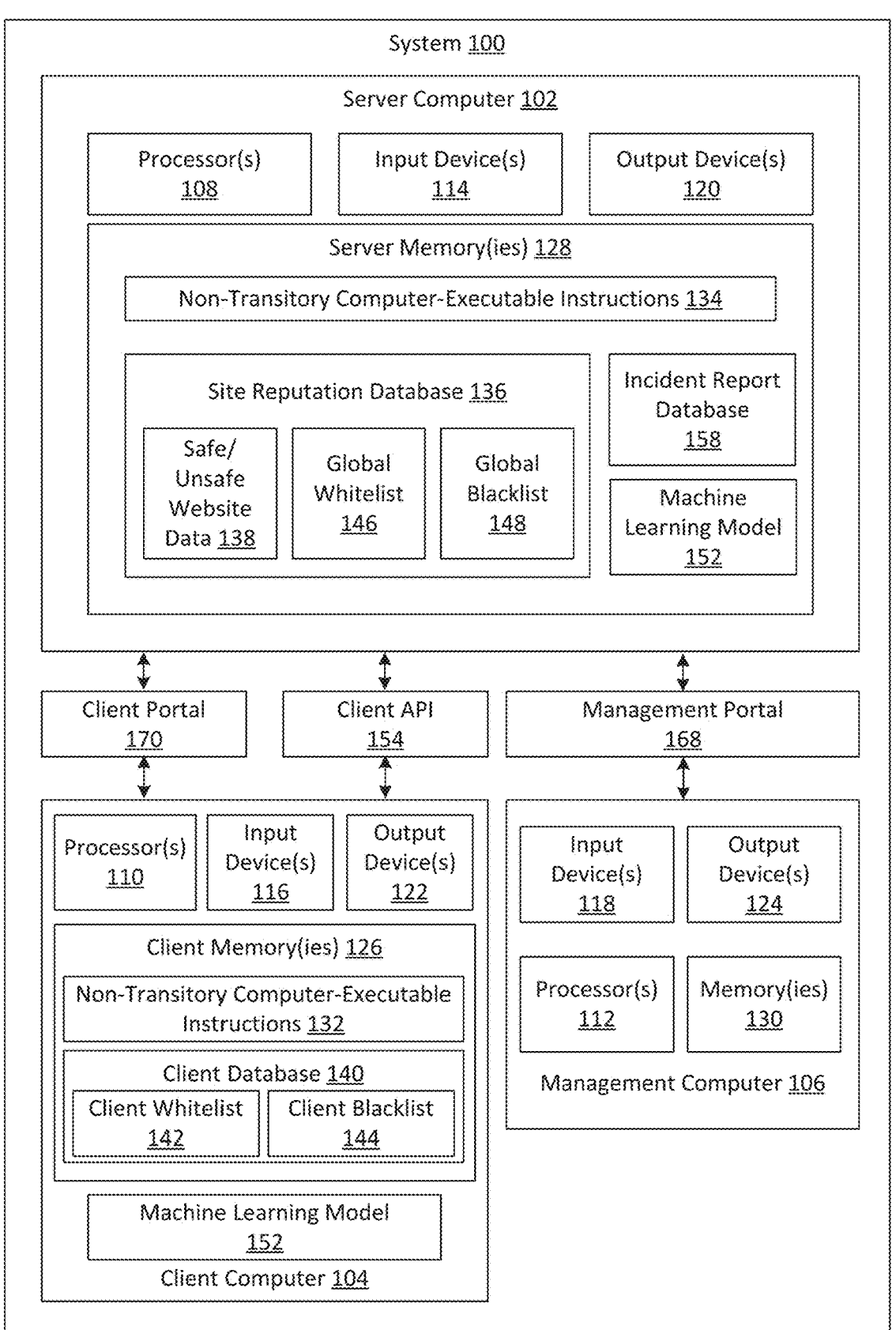
FIG. 1 is a block diagram illustrating an example system for detecting and preventing the navigation of a user computer to malicious websites according to aspects of the present disclosure.

This disclosure generally relates to systems that detect malicious websites and prevent users from navigating to such websites. In particular, this disclosure relates to systems that detect malicious websites using machine learning models and one or more domain name databases containing data on safe and unsafe websites. When the system detects a new unsafe website, the system may update the one or more domain name databases to include data on the new unsafe website. The machine learning model may be retrained using the one or more domain name databases to enhance the detection of malicious websites.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and any accompanying claims.

The described systems and techniques may be performed by a system that includes a single computer or more than one computer. A computer may be a processor-controlled device, such as, by way of example, personal computers, workstations, servers, clients, mini-computers, mainframe computers, laptop computers, smartphones, tablets, a network of one or more individual computers, mobile computers, portable computers, handheld computers, palmtop computers, set-top boxes for a TV, interactive televisions, interactive kiosks, personal digital assistants, interactive wireless devices, or any combination thereof.

A computer may be a uniprocessor or multiprocessor machine. Accordingly, a computer may include one or more processors and, thus, the aforementioned system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field-programmable gate arrays (FPGAs), programmable logic devices (PLDs), gated logic, and other suitable hardware configured to perform the various functionality described throughout this disclosure.

Additionally, the computer may include one or more memories. Accordingly, the aforementioned system may include one or more memories. A memory may include a memory storage device or an addressable storage medium which may include, by way of example, random access memory (RAM), static random access memory (SRAM), dynamic random access memory (DRAM), electronically erasable programmable read-only memory (EEPROM), programmable read-only memory (PROM), erasable programmable read-only memory (EPROM), hard disks, floppy disks, laser disk players, digital video disks, compact disks, videotapes, audio tapes, magnetic recording tracks, magnetic tunnel junction (MTJ) memory, optical memory storage, quantum mechanical storage, electronic networks, and/or other devices or technologies used to store electronic content such as programs and data.

In particular, the one or more memories may store computer-executable instructions that, when executed by the one or more processors, cause the one or more processors to implement the procedures and techniques described herein. The one or more processors may be operably associated with the one or more memories so that the computer-executable instructions can be provided to the one or more processors for execution. For example, the one or more processors may be operably associated to the one or more memories through one or more buses. Furthermore, the computer may possess or may be operably associated with input devices (e.g., a keyboard, a keypad, controller, a mouse, a microphone, a touch screen, a sensor) and output devices such as (e.g., a computer screen, printer, or a speaker).

The computer may execute an appropriate operating system such as LINUX®, UNIX®, MICROSOFT® WINDOWS®, APPLE® MACOS®, IBM® OS/2®, ANDROID, and PALM® OS, and/or the like. The computer may advantageously be equipped with a network communication device such as a network interface card, a modem, or other network connection device suitable for connecting to one or more networks.

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features or operations of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and/or the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with some of the teachings described herein. In some embodiments, very specific computing machines, with specific functionality, may be required. Similarly, it may prove advantageous to construct a specialized apparatus to perform the method steps described herein by way of dedicated systems with hard-wired logic or programs stored in nonvolatile memory, such as, by way of example, read-only memory (ROM).

In some embodiments, features of the systems can be implemented primarily in hardware using, for example, hardware components such as application-specific integrated circuits (ASICs) or field-programmable gated arrays (FPGAs). Implementation of the hardware circuitry will be apparent to persons skilled in the relevant art(s). In yet another embodiment, features of the systems can be implemented using a combination of both general-purpose hardware and software.

In one aspect, a system is disclosed. FIG. 1 illustrates one embodiment of the system 100 configured to detect and prevent the navigation of a user computer to malicious websites. As shown in FIG. 1, the system 100 may include one or more computers, which may include a server computer 102, a client computer 104, and/or a management computer 106. The one or more computers may comprise one or more processors, such as processors 108 of the server computer 102, processors 110 of the client computer 104, and processors 112 of the management computer 106. The one or more computers may also comprise one or more input devices (e.g., a mouse or a keyboard), such as input devices 114 of the server computer 102, input devices 116 of the client computer 104, and input devices 118 of the management computer 106. The one or more computers may also comprise one or more output devices, including visual output devices (i.e., a screen) and/or audio output devices (i.e., speakers, headphones, etc.), such as output devices 120 of the server computer 102, output devices 122 of the client computer 104, and output devices 124 of the management computer 106.

Further, the one or more computers may include one or more memories. In embodiments including the client computer 104, the one or more memories may include one or more client memories 126 operably associated with the client computer 104. Similarly, in embodiments including the server computer 102, the one or more memories may include one or more server memories 128 operably associated with the server computer 102. Likewise, in embodiments including the management computer 106, the one or more memories may include one or more memories 130 operably associated with the management computer 106. The one or more memories may store non-transitory computer-executable instructions which, upon execution, may cause the one or more processors of the one or more computers to detect and prevent navigation of a user computer to malicious websites or perform one or more of the operations or methods described herein. For instance, the client memories 126 may store non-transitory computer-executable instructions 132 which, upon execution, may cause the one or more processors 110 of the client computer 104 to detect and prevent navigation of a user computer to malicious websites or perform one or more of the operations or methods described herein. Similarly, the server memories 128 may store non-transitory computer-executable instructions 134 which, upon execution, may cause the one or more processors 108 of the server computer 102 to detect and prevent navigation of a user computer to malicious websites or perform one or more of the operations or methods described herein.

The system 100 may comprise data stored on the one or more memories of the one or more computers. The data may include information on safe and/or unsafe websites, such as the domain names associated with such websites. In some embodiments, the data may be organized into one or more domain name databases. The one or more domain name databases may include a site reputation database 136. In embodiments including the server memories 128, the site reputation database 136 may be stored on the server memories 128 as shown in FIG. 1. The site reputation database 136 may include also data 138 on safe and/or unsafe domain names. The data 138 on safe domain names may be based on publicly available whitelists. For example, the data 138 on safe domain names may be based on a whitelist published by Google® listing the top 300,000 domain names most visited from Google Chrome® browsers. The data 138 on unsafe domain names may be based on one or more of public blacklists of domain names, impersonation websites, impersonation domain names, recently registered domain names (e.g., websites registered in last seven days), and websites or domain names reported or flagged as unsafe by a user or a system (e.g., the system 100).

The one or more domain name databases may include a client database 140 instead of or in addition to the site reputation database 136. In embodiments including the client memories 126, the client database 140 may be stored on the client memories 126 as shown in FIG. 1. In other embodiments, the client database 140 may be stored in public cloud storage, such as an S3 bucket available from Amazon Web Services®. The client database 140 may include a client whitelist 142 and/or a client blacklist 144. The client whitelist 142 may be based on websites frequently visited or marked as safe by the user or a system administrator. The client blacklist 144 may be based on websites or domain names reported or flagged as unsafe by a system or the user.

The one or more domain name databases may include links to the original full uniform resource locator (URL) associated with the domain names stored in the one or more domain name databases. The non-transitory computer-executable instructions may cause the one or more processors of the one or more computers to index the domain names stored in the one or more domain name databases using the full uniform resource locators (URLs). In some embodiments, the non-transitory computer-executable instructions may cause the one or more processors of the one or more computers to generate blacklists and whitelists from the data on safe and/or unsafe websites. For example, the site reputation database 136 may include a global whitelist 146 of safe domain names or a global blacklist 148 of unsafe domain names, which are generated using the data 138 on safe and/or unsafe domain names. As another example, the client whitelist 142 and client blacklist 144 may be generated from the data 138 on safe and/or unsafe websites in the site reputation database 136. The generated whitelists and blacklists may be queryable and indexable by the browser extension discussed herein.

In some embodiments, the non-transitory computer-executable instructions may cause the one or more processors of the one or more computers to display a web browser. Examples of web browsers for use with the system described herein include but are not limited to Google Chrome®, Mozilla® Firefox®, Internet Explorer®, Apple® Safari®, Microsoft Edge® and/or the like. The web browser may include a browser window and may be displayed on a visual output device.

Figure 2:
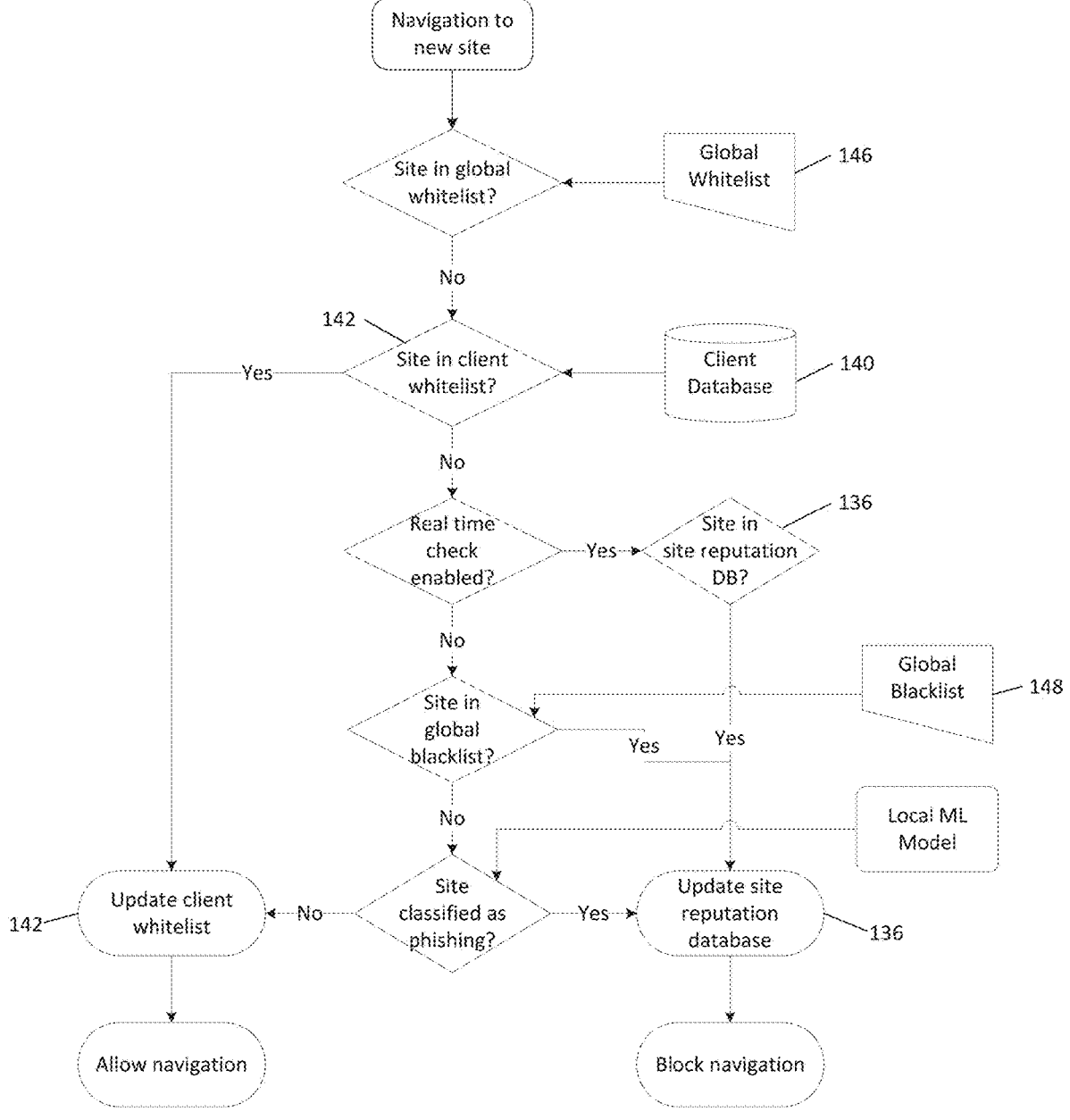
FIG. 2 is a flow diagram illustrating an example operation of the system for detecting and preventing the navigation of a user computer to malicious websites according to aspects of the present disclosure.

FIG. 2 is a diagram illustrating the operation of one embodiment of the system of the present disclosure. The non-transitory computer-executable instructions may cause the one or more processors of the one or more computers to receive via the web browser a request to retrieve or navigate to a webpage via a domain name. For example, a request to retrieve a webpage may be received when a user manually enters a domain name into the web browser using an input device such as a keyboard. In another example, a request to retrieve a webpage may be received from other programs, such as an email client, word processor, or document viewer, when a user clicks on a hyperlink in the program.

In some embodiments, the non-transitory computer-executable instructions may cause the one or more processors of the one or more computers to implement a browser extension associated with the web browser. The browser extension is software code (or other forms of logic) that extends the capability and functionality of the browser once installed in the web browser (or installed to function with the web browser). For example, the browser extension of the present disclosure allows the system to perform one or more of the operations described herein within the web browser environment. In some embodiments, the browser extension may be automatically implemented when the web browser is launched. In other embodiments, the browser extension may be implemented in response to an input from the user. Upon implementation, the browser extension may retrieve the client database 140, client whitelist 142, and/or client blacklist 144.

In some embodiments, the non-transitory computer-executable instructions may cause the one or more processors of the one or more computers to extract via the browser extension a uniform resource locator (URL) associated with the requested webpage. As shown in FIG. 2, the non-transitory computer-executable instructions may cause the one or more processors of the one or more computers to compare the URL with the one or more domain name databases to determine if the URL is safe or unsafe. As used herein, "comparing" the URL to the one or more domain name databases may be done by searching the one or more domain name databases for domain names identical or similar to the URL or a domain name associated with the URL.

For example, the operation of comparing the URL with the domain name database may include comparing the URL with the site reputation database 136 or the client database 140 to determine if the URL is safe or unsafe. In embodiments including one or more of the global whitelist 146, global blacklist 148, client whitelist 142, or client blacklist 144, the operation of comparing the URL with the domain name database may include comparing the URL with one or more of the global whitelist 146, global blacklist 148, client whitelist 142, and client blacklist 144. In some embodiments, the operation of comparing the URL with one or more of the domain name databases may include querying and indexing one or more of the whitelists and/or blacklists.

Figure 3:
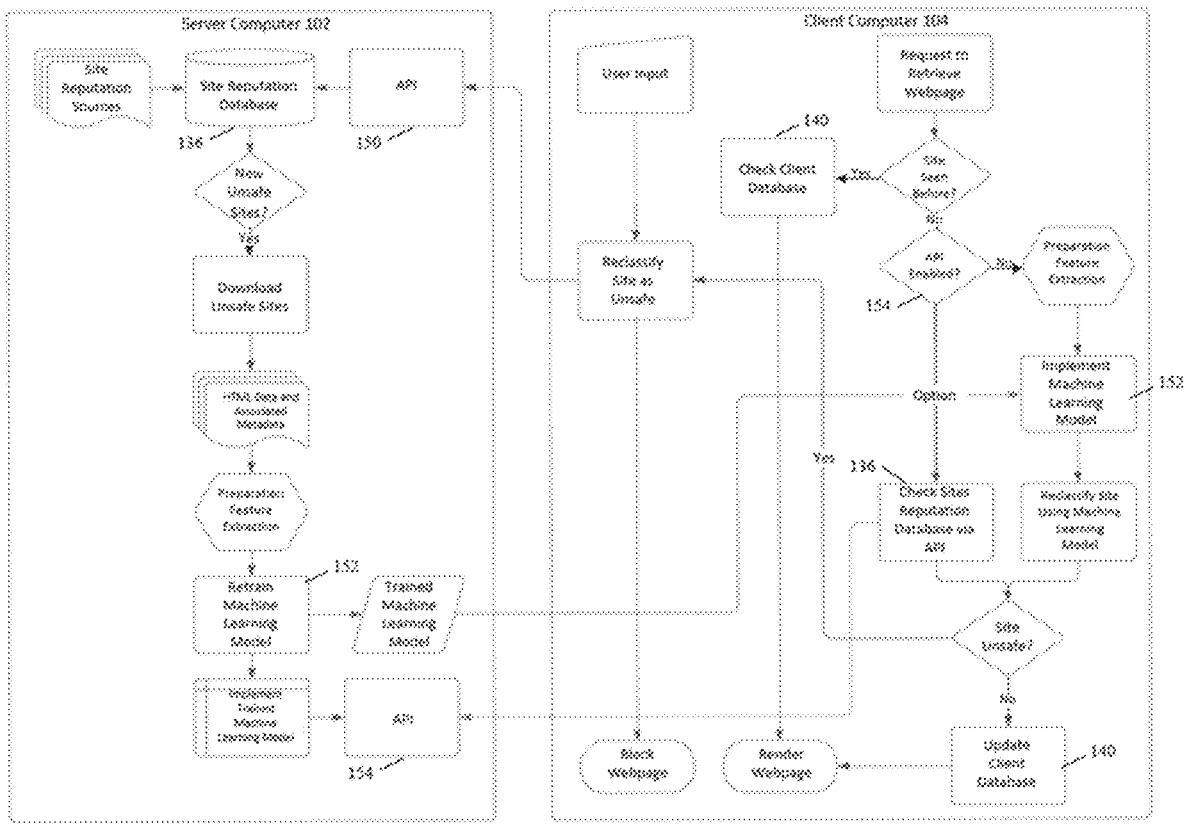
FIG. 3 is a flow diagram illustrating an example interoperation of a server computer and a client computer of the system for detecting and preventing the navigation of a user computer to malicious websites according to aspects of the present disclosure.

FIG. 3 is a diagram illustrating the interoperation of the server computer 102 and client computer 104. As shown in FIG. 3, when the site reputation database 136 is stored on the server memories 128, the operation of comparing the URL to the domain name database may include comparing the URL with the site reputation database 136 via an application programming interface (API) 150 to determine if the URL is safe or unsafe.

In some embodiments, the non-transitory computer-executable instructions may cause the one or more processors of the one or more computers to determine whether the URL is safe or unsafe based on comparing the URL with the one or more domain name databases. As an example, if an identical or similar domain name is classified as unsafe in the one or more domain name databases (e.g., an identical or similar domain name is found in the global whitelist 146 or client whitelist 142), the URL may be determined to be safe. If the URL is determined to be safe, the non-transitory computer-executable instructions may cause the one or more processors of the one or more computers to allow the requested webpage to be rendered in the browser window. In contrast, if an identical or similar domain name is classified as unsafe in the one or more domain name databases (e.g., an identical or similar domain name is found in the global blacklist 148 or client blacklist 144), the URL may be determined to be unsafe. If the URL is determined to be unsafe, the non-transitory computer-executable instructions may cause the one or more processors of the one or more computers to block the requested webpage from being rendered in the browser window.

The non-transitory computer-executable instructions may cause the one or more processors of the one or more computers to implement a machine learning model 152 configured to analyze the URL. The machine learning model 152 is software code that encodes for a program that can be trained and used to analyze and classify unsafe websites based on already existing and classified safe and/or unsafe websites. In embodiments including the server computer 102, the machine learning model 152 may be implemented via one or more processors 108 of the server computer 102. In embodiments including the client computer 104, the machine learning model 152 may be implemented via the one or more processors of the client computer 104. For example, the machine learning model 152 may be implemented within the web browser environment on the client computer 104. As shown in FIG. 3, in embodiments including both the server computer 102 and client computer 104, the system 100 may be configured such that the machine learning model 152 may be implemented on either the server computer 102 or the client computer 104.

The non-transitory computer-executable instructions may cause the one or more processors of the one or more computers to reclassify the URL as safe or unsafe using the machine learning model 152. The operation of reclassifying the URL locator as safe or unsafe may include analyzing HTML data associated with the URL via the machine learning model 152. In some embodiments, the operation of reclassifying the URL as safe or unsafe may also include analyzing HTML data associated with the URL via the machine learning model 152.

In embodiments where the operation of implementing the machine learning model 152 is performed via the one or more processors of the server computer 102, the operation of reclassifying the URL as safe or unsafe may include communicating the URL from the client computer 104 to the server computer 102 via an API 154, analyzing the URL using the machine learning model 152 to determine if the URL is safe or unsafe, and communicating whether the URL was reclassified as safe or unsafe from the server computer 102 to the client computer 104 via the API 154 as shown in FIG. 3. In embodiments where the operation of implementing the machine learning model 152 is performed via the one or more processors of the client computer 104, the operation of reclassifying the URL as safe or unsafe may be performed via the client computer 104.

In some embodiments, the operations of implementing a machine learning model 152 configured to analyze the URL and reclassifying the URL as safe or unsafe using the machine learning model 152 may only be performed when the URL is determined to be unsafe. In other embodiments, the operations of implementing a machine learning model 152 and reclassifying the URL may be performed regardless of whether the URL is determined to be safe or unsafe. As shown in the embodiment of FIG. 3, the operations of implementing a machine learning model 152 may be performed when the URL cannot be determined to be safe or unsafe, such as when the URL or a related domain name is not found in the one or more domain name databases or any of the whitelists or blacklists. In such embodiments, the non-transitory computer-executable instructions may cause the one or more processors of the one or more computers to determine if the URL is safe or unsafe.

If the URL is reclassified as safe, the non-transitory computer-executable instructions may cause the one or more processors of the one or more computers to allow the requested webpage to be rendered in the browser window. If the URL is reclassified as unsafe, the non-transitory computer-executable instructions may cause the one or more processors of the one or more computers block the requested webpage from being rendered in the browser window.

Figure 4:
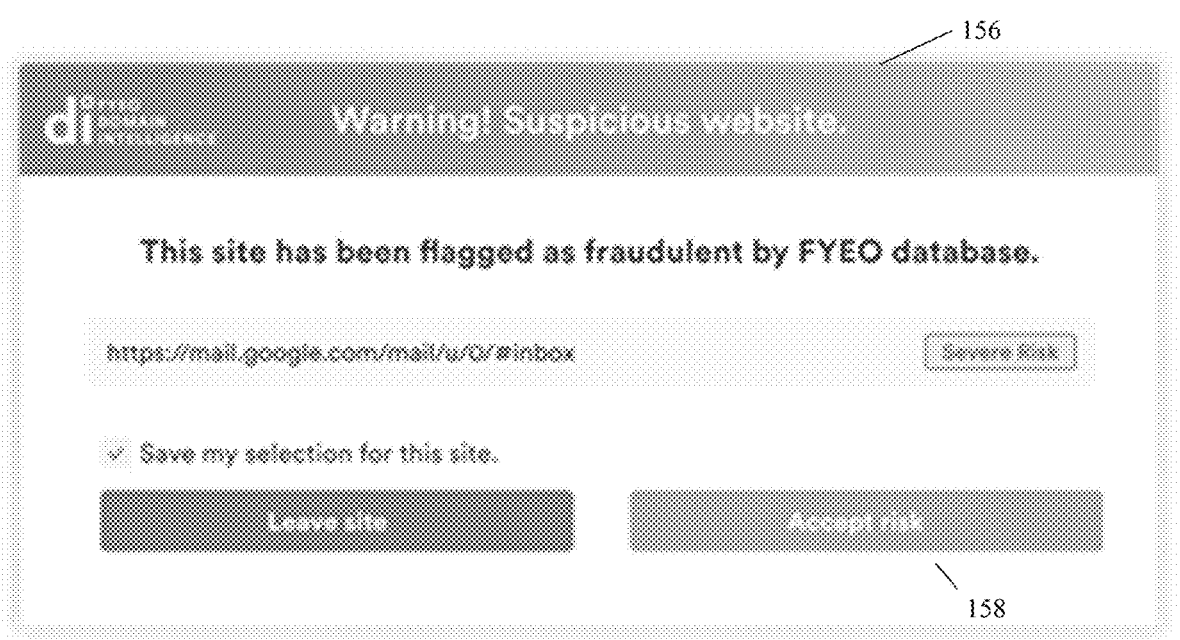
FIG. 4 is a block diagram illustrating an example interface of the system for detecting and preventing the navigation of a user computer to malicious websites according to aspects of the present disclosure.

In some embodiments, the operation of blocking the requested webpage may include the operation of notifying a user via a notification that the URL is unsafe. The user may be notified using the one or more computers. For example, in embodiments including the client computer 104, the user may be notified via the client computer 104. The notification may be a visual notification, such as a pop-up box 156 as shown in FIG. 4. Such visual notifications may be displayed via a visual output device of the one or more computers. The notification may also be audible, such as a tone that is played over an audio output device of the one or more computers.

The operation of blocking the requested webpage may also include the operation of receiving a request to render the requested webpage in the browser window. For example, as shown in FIG. 4, when the notification is a pop-up box 156 displayed on a visual output device of the one or more computers, the pop-up box 156 may include a clickable button 158 and the one or more computers may be configured to receive a request to render the requested webpage when the user clicks on the button 158 using an input device. Upon receiving the request to render the requested webpage, the non-transitory computer-executable instructions may cause the one or more processors of the one or more computers to allow the requested webpage to be rendered in the browser window. Further, the non-transitory computer-executable instructions may cause the one or more processors of the one or more computers to generate an incident report.

An incident report may be a record or file including data on potential or confirmed navigation to unsafe websites. Each incident report may include data such as the domain name of the unsafe website that was navigated to, the time and date of the navigation to the unsafe domain name, domain name, user ID, etc. Incident reports may be stored on the one or more memories of the one or more computers, such as the server computer 102, and may be organized into an incident report database 158. In some embodiments, when a requested webpage is rendered in the browser window, the non-transitory computer-executable instructions may cause the one or more processors of the one or more computers to detect a data breach. A data breach may be an incident where the requested webpage steals or takes user information, such as user credentials, name, date of birth, address, telephone numbers, financial information, etc., without a user or administrator's knowledge or authorization. Information about the data breach may be stored as part of the relevant incident report.

In some embodiments, the non-transitory computer-executable instructions may also cause the one or more processors of the one or more computers to update the one or more domain name databases with data on the URL if the URL is reclassified as safe or unsafe. For example, the operation of updating the one or more domain name databases with data on the URL may include updating the global whitelist 146 and/or the client whitelist 142 to include the URL or a domain name associated with the URL if the URL is reclassified as safe. As another example, updating the one or more domain name databases with data on the URL may include updating the site reputation database 136, the global blacklist 148, and/or the client blacklist 144 to include the URL or a domain name associated with the URL if the URL is reclassified as unsafe. In embodiments where the site reputation database 136 is stored on the one or more memories 128 of the server computer 102, the operation of updating the site reputation database 136 includes communicating the data on the URL from the client computer 104 to the server computer 102 via the API 154 and updating the site reputation database 136 with the data on the URL via one or more processors 108 of the server computer 102.

Figure 5:
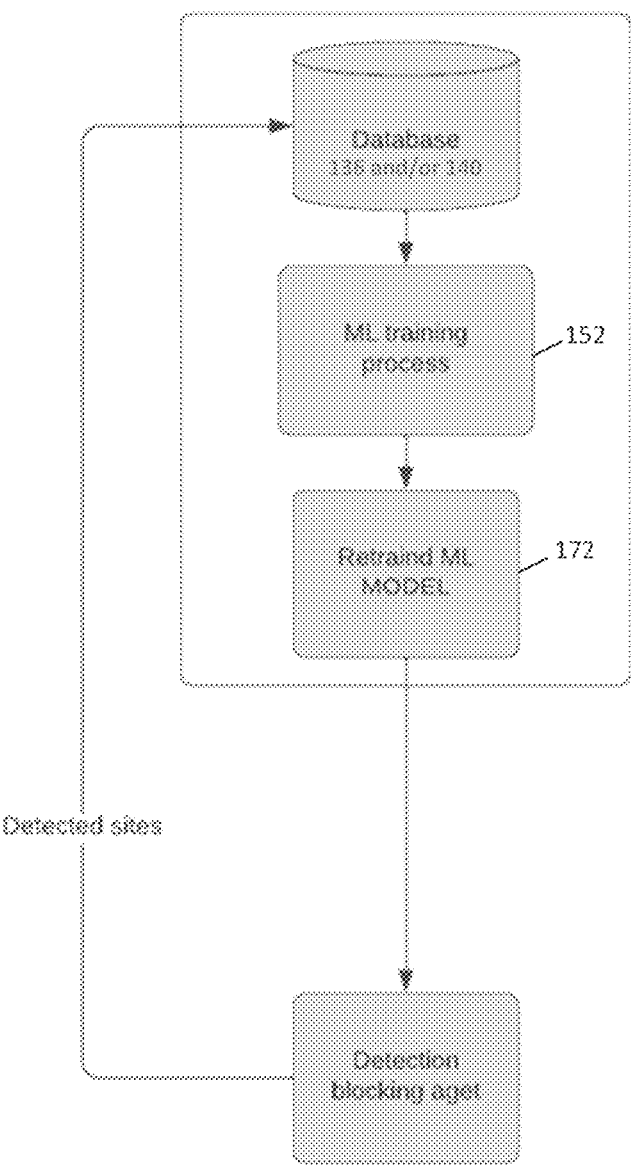
FIG. 5 is a flow diagram illustrating an example operation of training a machine learning model of the system for detecting and preventing the navigation of a user computer to malicious websites according to aspects of the present disclosure.
Figure 6:
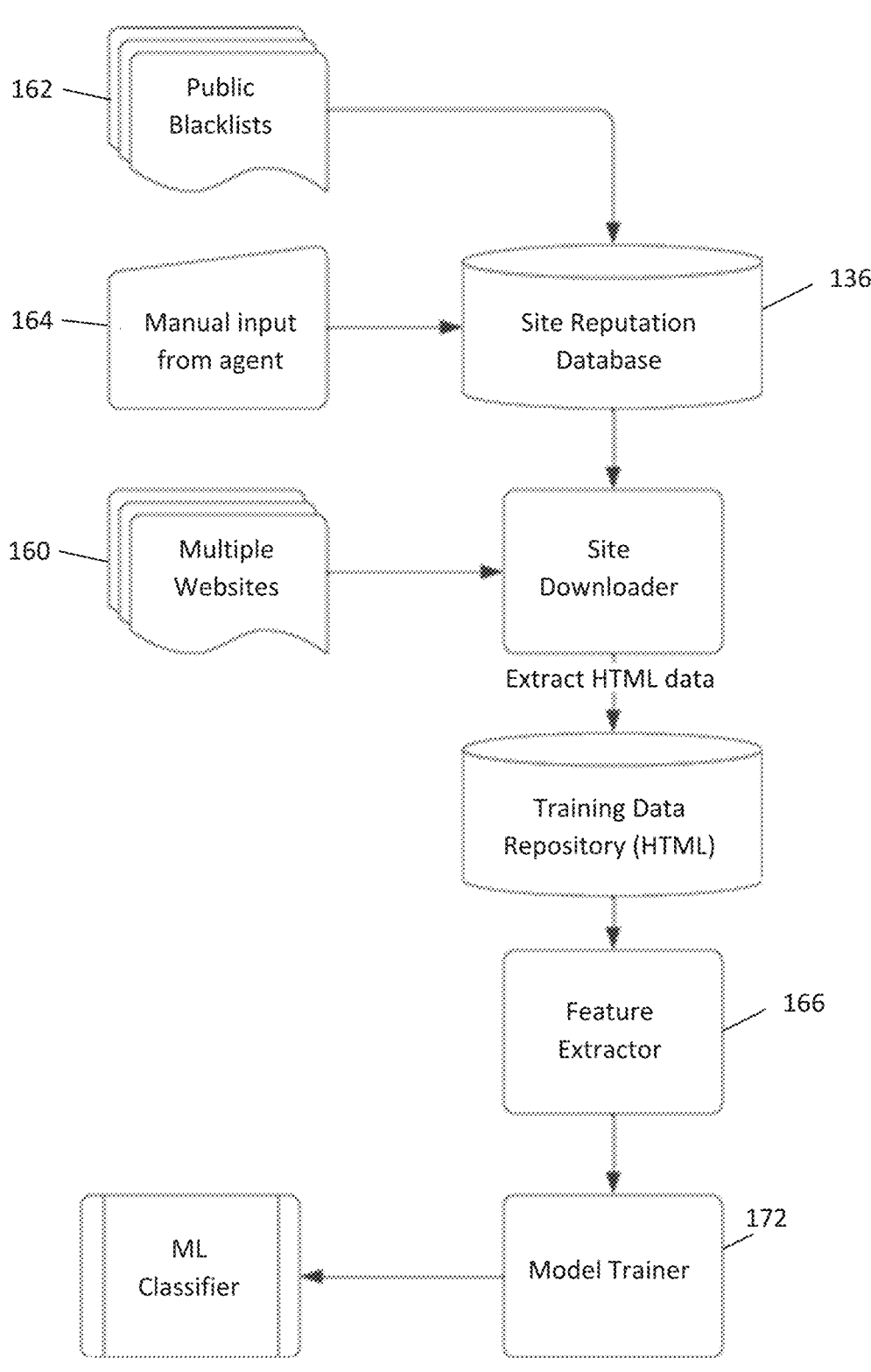
FIG. 6 is a flow diagram illustrating an example operation of training a machine learning model of the system for detecting and preventing the navigation of a user computer to malicious websites according to aspects of the present disclosure.

As shown in FIGS. 3 and 5-6, the non-transitory computer-executable instructions may also cause the one or more processors of the one or more computers to train the machine learning model 152 based on the URL. For example, the operation of training the machine learning model 152 based on the URL may be performed when the URL is classified as safe or unsafe. In embodiments where the one or more domain name databases, such as the site reputation database 136, are updated when the URL is classified as safe or unsafe, the operation of training the machine learning model 152 based on the URL may include training the machine learning model 152 using the updated one or more domain name databases.

As shown in FIG. 6, the operation of training the machine learning model 152 may include downloading unsafe websites based on the data on unsafe domain names in the one or more databases. For example, the operation of downloading unsafe websites may include downloading websites 160 associated with domain names in the site reputation database 136, which may include domain names from publicly available blacklists 162 or websites marked as unsafe by a user or administrator 164. The operation of training the machine learning model 152 may include extracting HTML data from the downloaded unsafe websites 160 and, in some embodiments, deriving associated metadata from the extracted HTML data. In such embodiments, the operation of training the machine learning model 152 may be performed using the extracted HTML data and/or the associated metadata derived from the HTML data. As shown in FIG. 6, in some embodiments, the non-transitory computer-executable instructions may also cause the one or more processors of the one or more computers to perform feature extraction 166 on the HTML data or associated metadata to transform the HTML data or associated metadata into a form suitable for training the machine learning model 152.

In embodiments including the server computer 102, the operation of training the machine learning model 152 may be performed via the one or more processors of the server computer 102 as shown in FIG. 3. In embodiments where the operation of implementing the machine learning model 152 is performed via the one or more processors of the client computer 104, a copy of the trained machine learning model 172 may be transmitted to the client computer 104 to replace the previous version of the machine learning model 152. The operation of training the machine learning model 152 may be performed at regular intervals such as weekly, daily, or every two, four, six, eight, or twelve hours, as non-limiting examples. In some embodiments, the machine learning model 152 may be trained hourly. The operation of the machine learning model 152 may also be performed in response to a request received from a user or automatically when one or more of the domain name databases are updated.

In some embodiments, the non-transitory computer-executable instructions may cause the one or more processors of the one or more computers to display one or more portals. For example, in embodiments including a management computer 106 and a server computer 102, the non-transitory computer-executable instructions cause the one or more processors of the server computer 102 to provide and display a management portal 168 accessible by the management computer 106 and display incident reports via the management portal 168. As another example, in embodiments including a client computer 104 and a server computer 102, the non-transitory computer-executable instructions may cause one or more processors of the server computer 102 to provide and display a client portal 170 accessible by the client computer 104 and display incident reports via the client portal 170. In some embodiments, the non-transitory computer-executable instructions may cause the one or more processors of the client computer 104 to receive a request to resolve one or more of the incident reports via the client portal 170. For example, the client portal 170 may be configured to receive a request to resolve one or more of the incident reports from a user via an input device 116 on the client computer 104.

Clearly, the systems have a wide application anywhere where detecting and preventing navigation to malicious websites are needed. One particularly important application for the systems and methods described herein relates to detecting and preventing navigation of a user computer to malicious websites in web browsers, as described above. However, the systems and methods described above could be utilized in other contexts, such as the detection and blocking of malicious websites included or linked to in documents, emails, digital storage devices, etc.

Those skilled in the art will recognize improvements and modifications to the preferred embodiments of the present disclosure. All such improvements and modifications are considered within the scope of the concepts disclosed herein and the claims that follow.

What is claimed is:

1. A system for detecting and preventing navigation of a user computer to malicious websites, the system comprising:
   one or more computers comprising one or more processors and one or more memories for storing a domain name database and having non-transitory computer-executable instructions for causing the one or more processors of the one or more computers to perform operations comprising:
   displaying a web browser including a browser window;
   implementing a browser extension associated with the web browser;
   receiving via the web browser a request to retrieve a webpage via a domain name;
   extracting via the browser extension a uniform resource locator (URL) associated with the webpage;
   comparing the URL with the domain name database to determine if the URL is safe or unsafe;
   if the URL is safe, allowing the requested webpage to be rendered in the browser window; and
   if the URL is unsafe,
      implementing a machine learning model configured to analyze the determined unsafe URL,
      reclassifying the URL as safe or unsafe using the machine learning model,
      if the URL is reclassified as safe, updating the domain name database with data on the reclassified URL to whitelist the domain name and allowing the requested webpage to be rendered in the browser window, and
      if the URL is reclassified as unsafe, blocking the requested webpage from being rendered in the browser window and training the machine learning model based on the reclassified unsafe URL.

2. The system of claim 1, wherein the one or more memories store a site reputation database including data on unsafe domain names, wherein the non-transitory computer-executable instructions cause the one or more processors of the one or more computers to update the site reputation database with data on the URL if the URL is reclassified as unsafe, and wherein the operation of training the machine learning model includes training the machine learning model using the site reputation database.

3. The system of claim 2, wherein the operation of training the machine learning model comprises:

downloading unsafe websites based on the data on unsafe domain names;

extracting HTML data from the downloaded unsafe websites;

deriving associated metadata from the HTML data; and training the machine learning model based on the extracted HTML data and the associated metadata derived from the HTML data.

4. The system of claim 2, wherein the one or more computers include a server computer and a client computer, wherein the operation of implementing the machine learning model is performed via one or more processors of the server computer, and wherein the operation of reclassifying the URL as safe or unsafe includes communicating the URL from the client computer to the server computer via an application programming interface (API), analyzing the URL using the machine learning model to determine if the URL is safe or unsafe, and communicating whether the URL was reclassified as safe or unsafe from the server computer to the client computer via the API.

5. The system of claim 4, wherein the one or more memories include a server memory operably associated with the server computer and storing the site reputation database, and wherein the operation of updating the site reputation database includes communicating the data on the URL from the client computer to the server computer via an application programming interface and updating the site reputation database with the data on the URL via one or more processors of the server computer.

6. The system of claim 4, wherein the site reputation database includes data on unsafe domain names based on one or more of publicly available blacklists of domain names, impersonation websites, impersonation domain names, and recently registered domain names, and wherein the non-transitory computer-executable instructions cause the one or more processors of the client computer to perform further operations comprising comparing the URL with the site reputation database via an application programming interface to determine if the URL is safe or unsafe.

7. The system of claim 4, wherein the operation of implementing the machine learning model is performed via the one or more processors of the client computer.

8. The system of claim 1, wherein the operation of blocking the requested webpage comprises the operations of:

notifying a user via a notification that the URL is unsafe;

receiving a request to render the requested webpage in the browser window;

allowing the requested webpage to be rendered in the browser window; and generating an incident report.

9. The system of claim 8, wherein the one or more computers includes a management computer and a server computer, and wherein the non-transitory computer-executable instructions cause the one or more processors of the server computer to provide and display a management portal accessible by the management computer and display the incident report via the management portal.

10. The system of claim 8, wherein the one or more computers includes a client computer and a server computer, and wherein the non-transitory computer-executable instructions cause one or more processors of the server computer to provide and display a client portal accessible by the client computer and display the incident report via the client portal.

11. The system of claim 10, wherein the non-transitory computer-executable instructions cause the one or more processors of the client computer to receive a request to resolve one or more of incident reports via the client portal.

12. The system of claim 1, wherein the domain name database includes a client whitelist based on websites frequently visited or marked as safe by a user, and wherein the operation of comparing the URL with the domain name database includes comparing the URL with the client whitelist.

13. The system of claim 1, wherein the domain name database includes a global whitelist based on publicly available whitelists, and wherein the operation of comparing the URL with the domain name database includes comparing the URL with the global whitelist.

14. The system of claim 1, wherein the domain name database includes a client blacklist based on websites marked as unsafe by a user, and wherein the operation of comparing the URL with the domain name database includes comparing the URL with the client blacklist.

15. The system of claim 1, wherein the operation of reclassifying the URL as safe or unsafe further includes analyzing HTML data associated with the URL via the machine learning model.

16. A system for detecting and preventing navigation of a user computer to malicious websites, the system comprising:

one or more computers including a client computer, the one or more computers including one or more processors and one or more memories for storing a domain name database and having non-transitory computer-executable instructions for causing the one or more processors of the one or more computers to perform operations comprising:

displaying a web browser including a browser window;

implementing a browser extension associated with the web browser;

receiving via the web browser a request to retrieve a webpage via a domain name;

extracting via the browser extension a uniform resource locator (URL) associated with the webpage;

comparing the URL with the domain name database to determine if the URL is safe or unsafe;

if the URL is safe, allowing the requested webpage to be rendered in the browser window; and if the URL is unsafe, implementing a machine learning model configured to analyze the determined unsafe URL via the one or more processors of the client computer, reclassifying the URL as safe or unsafe using the machine learning model, if the URL is reclassified as safe, allowing the requested webpage to be rendered in the browser window, and if the URL is reclassified as unsafe, blocking the requested webpage from being rendered in the browser window.

17. The system of claim 16, wherein the one or more memories store a site reputation database including data on unsafe domain names, and wherein the non-transitory computer-executable instructions cause the one or more processors of the one or more computers to perform further operations comprising updating the site reputation database with data on the URL that is reclassified as unsafe and training the machine learning model using the updated site reputation database.

18. The system of claim 17, wherein the one or more computers include a server computer and a client computer, wherein the one or more memories include a server memory operably associated with the server computer and storing the site reputation database, wherein the operation of updating the site reputation database includes communicating the data on the URL from the client computer to the server computer via an application programming interface and updating the site reputation database with the data on the URL via the one or more processors of the server computer, and wherein one or more processors of the server computer perform the operation of training the machine learning model.

19. A system for detecting and preventing navigation of a user computer to malicious websites, the system comprising:
   one or more computers including a client computer, the one or more computers including one or more processors and one or more memories for storing a domain name database and having non-transitory computer-executable instructions for causing the one or more processors of the one or more computers to perform operations comprising:
   displaying a web browser including a browser window;
   implementing a browser extension associated with the web browser;
   receiving via the web browser a request to retrieve a webpage via a domain name;

extracting via the browser extension a uniform resource locator (URL) associated with the webpage;
comparing the URL with the domain name database to determine if the URL is safe or unsafe;
if the URL is safe, allowing the requested webpage to be rendered in the browser window; and
if the URL is unsafe,
   implementing a machine learning model configured to analyze the determined unsafe URL,
   reclassifying the determined unsafe URL as safe or unsafe using the machine learning model,
   if the URL is reclassified as safe, allowing the requested webpage to be rendered in the browser window, and
   if the URL is reclassified as unsafe,
      notifying a user via a notification that the URL is unsafe,
      receiving a request to render the requested webpage in the browser window or to block the requested webpage,
      if the request is to render the requested webpage in the browser window, allowing the requested webpage to be rendered in the browser window and generating an incident report, and
      if the request is to block the requested webpage, blocking the requested webpage from being rendered in the browser window, and
   providing a client portal accessible by the client computer, and
   displaying incident reports via the client portal.

20. The system of claim 19, wherein the non-transitory computer-executable instructions cause the one or more processors of the client computer to receive a request to resolve one or more of the incident reports via the client portal.

* * * * *